Sept. 6, 1966 K. H. CARPENTER 3,270,509

ACCESSORY DRIVE MECHANISM

Filed May 14, 1965

INVENTOR.
Keith H. Carpenter
BY
Robert L. Spencer
ATTORNEY

United States Patent Office 3,270,509
Patented Sept. 6, 1966

3,270,509
ACCESSORY DRIVE MECHANISM
Keith H. Carpenter, Pittsford, N.Y., assignor to General Motors Corporation, Detroit, Mich., a corporation of Delaware
Filed May 14, 1965, Ser. No. 455,855
6 Claims. (Cl. 60—54)

This invention relates to an accessory drive and particularly to an accessory drive of the type adapted for driving engine driven accessories, such as, for example, an engine cooling fan, vehicle refrigeration compressor, generator, or power steering pump. The invention provides a hydraulic drive and control adapted to provide a generally linear increase of output speed with increase of input speed in a first relatively low speed range of input speed, to provide a generally constant output speed, throughout a second higher speed range of input speed, and to provide a generally linear increase in output speed with further increase in input speed in a third higher speed range of input speed. The control of output speed is accomplished by controlling the area of the fluid flow path of fluid circulating in the hydraulic mechanism to accomplish the output speeds desired in the various input speed ranges in order to reduce power consumption in the hydraulic drive mechanism per se and power consumption of the accessories driven by the hydraulic drive mechanism. The control arrangement includes a valve having blades extending into the path of travel of fluid between the impeller torus and turbine torus and connected for rotation with the impeller. A spring connection between the valve and impeller yieldably biases the blades to a position wherein fluid flow is unrestricted in a first range of input speed of the impeller. A magnetic drag cup acts upon the hub of the valve to cause limited angular rotation of the valve blades relative to the impeller such that in a second higher speed range of input speed the valve is progressively rotated relative to the impeller to progressively restrict the flow path of fluid. In a third higher speed range of input speed the position of the valve blades and impeller remain constant such that the restricted flow path area remains constant. The control is simple in structure and inexpensive to manufacture and provides desirable results in terms of reduced power consumption in the hydraulic drive per se and reduced output speeds relative to input speed in the second and third input speed ranges heretofore mentioned.

These and other advantages of this invention will be apparent from the following description taken in conjunction with the accompanying drawings, in which.

Figure 1:
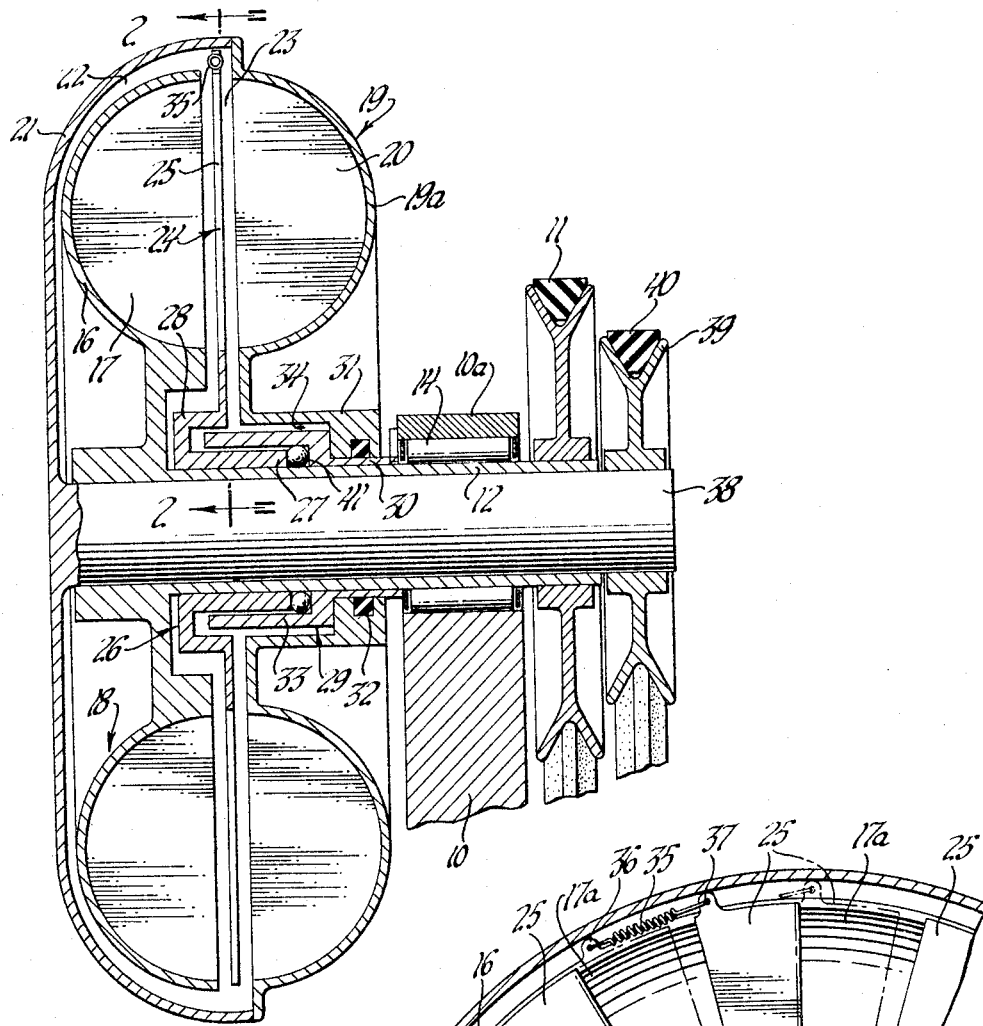
FIGURE 1 is a longitudinal sectional view through a hydraulic coupling incorporating the principles of this invention.

Referring to FIGURE 1, there is shown a hydraulic drive mechanism constructed in accordance with the principles of this invention and particularly useful for driving engine accessories of an automotive vehicle such as a cooling fan. A fixed support 10 rotatably supports a power input shaft 12 therein by means of a bearing 14. An engine driven belt 11, driven from an engine crankshaft pulley (not shown) transmits power from the engine shaft pulley (not shown) to a drive pulley fixed to shaft 12 to drive (not shown) to a drive pulley fixed to shaft 12 to drive shaft 12 at a speed proportional to engine speed. An input torus or impeller indicated generally at 18 includes a hub driven by input shaft 12, a drum 16 and impeller blades 17.

Figure 2:
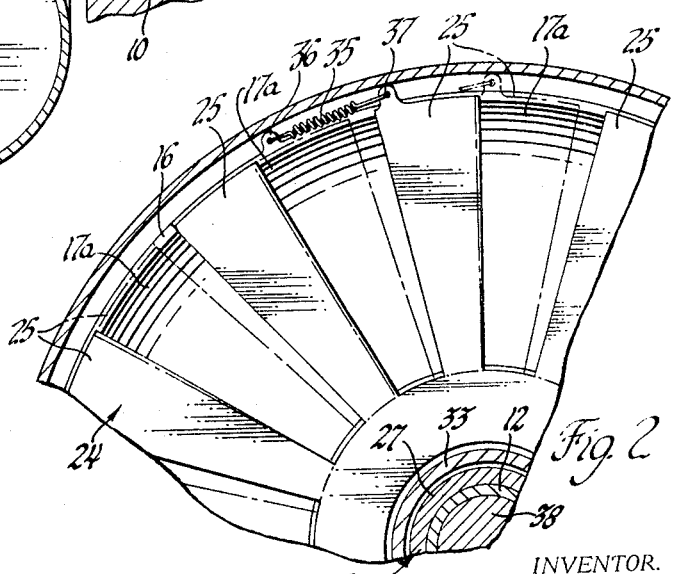
FIGURE 2 is a sectional view taken along the line 2—2 of FIGURE 1.

As best shown in FIGURE 2, blades 17 are spaced from each other to provide cup-shaped pockets or buckets 17a between the blades and drum 16, the buckets 17a being spaced from each other by blades 17. A power delivery torus or turbine indicated generally at 19 includes a drum 19a containing blades 20 and connected to a power delivery shaft 38 by a drum 21 to drive the power delivery shaft. Drums 19, 21 form a closed chamber 22 filled with working fluid. The adjacent edges of blades 17 and 20 are axially spaced from each other to provide a space or parting zone 23 therebetween adapted to receive a valve 24 having spaced blades 25 extending into the parting zone 23 between the adjacent edges of blades 17, 20. Blades 25 of valve 24 are supported on a generally cup-shaped hub 26 having a hollow sleeve portion 27 supported upon the exterior surface of input shaft 12 and an axially extending angular sleeve portion 28 spaced from axially extending sleeve 27. Blades 25 extend radially outwardly from sleeve 28 into parting zone 23. A non-rotatable magnetic drag cup 29 includes a sleeve portion 30 contacting the outer surface of input shaft 12 and extending axially outwardly from chamber 22 and anchored against rotation by support 10a. Hub 31 of drum 19a supports drum 19a for rotation on sleeve 30, there being an oil seal 32 carried by hub 31 to prevent leakage of fluid from chamber 22. Drag cup 29 includes an axially extending sleeve 33 disposed in a chamber 34 formed by turbine hub 31 and hub 26. Sleeve 33 is formed of permanently magnetized material and extends axially into the space 35 between axially extending sleeves 27 and 28 of hub 26. A roller thrust bearing 41 is disposed between sleeve 30 and the end of sleeve 27.

As best shown in FIGURE 2, blades 25 of valve 24 are connected to drum 16 by means of a coil spring 35 anchored to ears 36 and 37 formed on impeller drum 16 and blades 25, respectively. While a single spring 35 is illustrated, it will be understood that a plurality of such springs may be employed, if desired. Spring 35 yieldably biases blades 25 to position valve blades 25 in a non-registering relationship with the path of travel of circulating working fluid. The impeller buckets 17a formed by the spaced blades 17 and the interior walls of drum 16 are fully open as illustrated in FIGURE 2, the valve blades 25 being positioned out of registration with buckets 17a by spring 35. It will readily be understood that the spaced blades 20 of turbine 19 form similar open faced turbine buckets with the interior surface of drum 19a adapted to receive fluid from buckets 17a. It will be apparent that valve 24 rotates with impeller 18 at the speed of rotation of impeller 18. Valve 24 is however rotatable through a limited angle of rotation relative to impeller 18 to vary the effective area of the fluid flow path from buckets 17a as hereafter explained.

Figure 3:
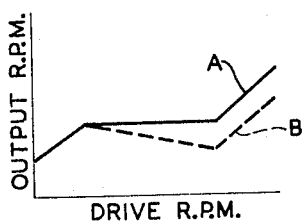
FIGURE 3 is a curve illustrating the relative input and output speeds in three input speed ranges.

Considering the operation of the assembly, with impeller 18 at rest, springs 35 bias valve 24 to position blades 25 out of the path of travel of fluid from impeller buckets 17a to turbine blades or buckets 20 and out of the path of travel of fluid from turbine blades or buckets 20 back to impeller buckets 17a. The impeller torus is fully open to the turbine torus, and at low impeller speeds the turbine 19 and impeller 18 rotate at substantially the same speed of rotation. As the impeller speed and valve speed increase, the magnetic drag between permanent magnet 33 and hub 26 of valve 24 increases, and this drag causes relative rotation of valve 24 and impeller 18, thereby partially blocking the flow of working fluid between the tori. Since spring 35 and the magnetic drag cup 33 function basically as linear devices, and since the portion of the fluid flow path which is blocked by valve blades 25 may be made linear with control valve position, a constant speed of output shaft 38 may be maintained over a fixed range of input speed of input shaft 12. Spring 35 due to action of magnetic drag will permit blades 25 to progressively block fluid flow through a predetermined range of increase of input speed of rotation of impeller 18. At speeds of the impeller 18 above the maximum limit of this predetermined speed range, the valve 24 will no longer move towards a fluid flow shut-off position but will remain in a fixed position such that the restriction to fluid flow remains constant. Thus, at input speeds, above a predetermined speed, the turbine speed will no longer remain constant but will increase in response to increase in input speed. At speeds below the lowest speed of said predetermined input speed range, spring 35 will position valve blades 25 to permit unrestricted fluid flow between the impeller and turbine. Thus, in this low range of input speed, the magnetic drag is not adequate to overcome spring 35 and the turbine speed will increase in proportion to increase in input speed. This relationship of output speed to input speed is shown in FIGURE 3 wherein in a first range of increase of input or impeller speed, the output speed increases linearly. In a second higher speed range of rotation of the impeller, the output speed remains constant. In the third higher speed range of the impeller, the output speed again increases linearly with increase in input speed.

It will be apparent that by the operation of valve 24, blades 25 choke off fluid flow to decrease the quantity of fluid pumped in the second speed range of operation of the impeller but never completely block the fluid flow path even in the third or highest impeller speed range. The area of fluid flow is constant in the lowest impeller speed range, is progressively decreased in the second impeller speed range in response to increase in impeller speed within this second speed range, and remains at a constant minimum area in the third or highest impeller speed range.

Since the area of both the fluid flow inlet and fluid flow outlet flow paths to and from the impeller torus are reduced proportionately and simultaneously, the impeller capacity is reduced. Thus the only power consumed in the hydraulic mechanism is being used for useful work with a consequent savings in economy. The arrangement is adapted for easy calibration to provide different output speeds relative to input speed once the control speed range of input speed is reached. This may easily be varied by varying the magnetic strength of the drag cup, by varying the weight of the spring, or by varying the area of the fluid flow opening. In FIGURE 3, the solid line A illustrates actual output speeds relative to input speeds for a unit of one given calibration, whereas the dotted line B illustrates the relationship of output speed to input speed for a second calibration. To arrive at the output speeds of curve B, a weaker spring or a stronger magnet or both could be substituted for the spring 35 and magnetic cup 29 employed to arrive at the speed relationship illustrated in the solid curve A.

It will be readily understood that power delivery shaft 38 may drive a single pulley 39 and belt 40 to drive the accessories or may drive multiple pulleys and belts, not shown.

I claim:

1. A hydraulic accessory drive unit for driving the accessories of an engine driven vehicle comprising an engine driven power input shaft, an impeller driven by said shaft, a turbine, a power delivery shaft for driving said accessories and driven by said turbine, open faced pockets in said impeller and turbine, respectively, and disposed in axial spaced relationship with the open faces facing each other, working fluid adapted to be circulated through said pockets in response to rotation of said impeller, a valve having a hub supporting a plurality of valve blades thereon, said valve blades extending upwardly into the space between said impeller and turbine, yieldable means connecting said valve to said impeller whereby said valve is caused to rotate with said impeller, said yieldable means normally biasing said valve to position said valve blades to permit unrestricted fluid flow between said impeller and turbine, magnetic means operable upon said valve tending to brake rotation of said valve, said yieldable means permitting relative rotation of said valve and said impeller in response to the brake effect of said magnetic means in a predetermined speed range of rotation of said impeller to progressively reduce the effective area of the path of fluid flow as the speed of rotation of said impeller increases throughout said predetermined speed range.

2. An accessory drive unit for driving the accessories of an engine driven vehicle comprising an engine driven power input shaft, an impeller driven by said shaft, a turbine, a power delivery shaft for driving said accessories and driven by said turbine, said impeller and turbine each being formed to provide open faced buckets having the open faces disposed in face to face relationship and axially spaced from each other, working fluid for driving said turbine, a valve having a hub supporting a plurality of spaced valve blades thereon, said blades extending into the space between said impeller and turbine buckets for controlling the effective area of the path of fluid flow from said impeller buckets to said turbine buckets, yieldable means connecting said valve to said impeller for rotation with said impeller, said yieldable means permitting limited angular rotation of said valve relative to said impeller, and magnetic drag means fixed against rotation and disposed adjacent said valve, said magnetic drag means applying a magnetic force to said valve tending to prevent rotation of said valve, said yieldable means in a predetermined speed range of rotation of said impeller permitting limited angular rotation of said valve relative to said impeller to progressively decrease the effective area of fluid flow from and to said impeller in response to magnetic force applied to said valve by said magnetic drag means.

3. A hydraulic accessory drive unit for driving the accessories of an engine driven vehicle comprising an engine driven power input shaft, an impeller driven by said input shaft, a power delivery shaft for driving said accessories, a turbine for driving said power delivery shaft, open faced pockets in said impeller and turbine, respectively, disposed in spaced axial relationship with each other and with the open faces of the impeller facing the open faces of said turbine, working fluid in said drive unit for driving said turbine in response to rotation of said impeller, a valve including a valve hub supporting a plurality of valve blades in the space between said impeller and turbine, yieldable means connecting said valve to said impeller for rotation therewith, said yieldable means normally positioning said valve blades out of the path of flow of fluid into and out of said impeller pockets, a permanent magnet fixed against rotation and positioned adjacent said valve hub for applying a magnetic drag to said valve hub tending to prevent rotation of said valve, said yieldable means in a first range of speed of rotation of said impeller maintaining said impeller and valve in a fixed position relative to each other to render said valve ineffective to inhibit fluid flow out of and into said impeller pockets, the speed of rotation of said turbine in said first speed range of rotation of said impeller increasing linearly with increase in speed of rotation of said impeller, said yieldable means in a second higher speed range of rotation of said impeller permitting angular rotation of said valve relative to said impeller in response to magnetic drag applied to said valve by said magnet to progressively block fluid flow out of and into said impeller pockets to thereby maintain a constant turbine speed of rotation throughout said second speed range of rotation of said impeller.

4. A hydraulic accessory drive unit for driving the accessories of an engine driven vehicle comprising an engine driven power input shaft, an impeller driven by said shaft, a power delivery shaft for driving said accessories, open faced pockets formed in said impeller and turbine for receiving circulating working fluid upon rotation of said impeller, said impeller and turbine being spaced axially from each other with the open faces of said pockets facing each other to receive circulating working fluid and to provide a parting zone between said impeller and turbine, a valve having blades disposed in said parting zone, a spring connecting said valve to said impeller for rotating said valve with said impeller, said spring biasing said valve to normally position said valve blades to permit unrestricted fluid flow out of and into said impeller pockets irrespective of the speed of rotation of said impeller within a first predetermined speed range of such rotation, a magnet fixed against rotation and applying a magnetic drag force to said valve tending to prevent rotation of said valve by said impeller, said magnetic drag force increasing in magnitude as the speed of rotation of said impeller is increased, said spring means permitting relative rotation of said impeller and valve throughout a second speed range of rotation of said impeller, said spring and magnetic drag coacting throughout said second speed range of rotation of said impeller to move said valve relative to said impeller to progressively decrease the area of the path of fluid flow from and to said impeller pockets to thereby maintain a constant turbine speed of rotation as said impeller speed increases its rotational speed throughout said second speed range.

5. An accessory drive as set forth in claim 4 wherein said impeller may be accelerated to rotate throughout a third higher speed range and wherein said magnetic drag is effective in said third higher speed range to position said valve in a fixed position with respect to said impeller pockets irrespective of the speed of rotation of said impeller in said third speed range, said turbine speed increasing linearly with increase in impeller speed as the speed of rotation of said impeller is increased throughout said third speed range.

6. A hydraulic accessory drive unit for driving the accessories of an engine driven vehicle comprising a hollow engine driven power input grill shaft, a power delivery shaft rotatably supported in said input shaft and connected to said accessories for driving the same, an impeller driven by said input shaft, a turbine for driving said power delivery shaft, working fluid in said unit, open faced pockets in said impeller and turbine, respectively, and spaced axially from each other to provide a parting zone between the open faces of said pockets, a valve including a hub supported on said power input shaft and having vanes extending outwardly into said parting zone, spring means connecting said valve to said impeller for rotation with said impeller, a magnetic cup fixed against rotation and including a hollow sleeve in concentric relationship with said valve hub, said spring in a first speed range of rotation of said impeller acting on said valve to position said valve to permit maximum fluid flow out of and into said impeller cups irrespective of the speed of rotation of said impeller in said first speed range, the speed of rotation of said turbine increasing linearly with increase in speed of rotation of said impeller as the speed of said impeller is increased in said first speed range, said magnetic cup applying a magnetic drag to said valve hub of increasing magnitude as the speed of rotation of said impeller increases, said impeller being rotatable in a secand higher speed range than said first higher speed range, said magnetic cup and said spring coacting in said second impeller speed range to progressively move said valve relative to said impeller to decrease the effective area of fluid flow of fluid out of and into said impeller pockets as the speed of rotation of said impeller increases throughout said second speed range, the speed of rotation of said turbine being constant irrespective of the speed of rotation of said impeller in said second speed range, said impeller being rotatable in a third higher speed range, said magnetic drag positioning said valve relative to said impeller to maintain a fluid flow path of constant area for flow of fluid from and to said impeller pockets irrespective of the speed of rotation of said impeller in said third speed range, said turbine speed increasing linearly with increase in impeller speed as the speed of said impeller is increased in said third speed range.

References Cited by the Examiner
UNITED STATES PATENTS 2,390,133 12/1945 Snyder _____ 60—54
2,464,215 3/1949 Copeland _____ 60—54

EDGAR W. GEOGHEGAN, *Primary Examiner.*